(12) United States Patent
Mahadevan et al.

(10) Patent No.: US 12,211,514 B2
(45) Date of Patent: Jan. 28, 2025

(54) SYSTEM AND METHOD FOR FACILITATING DATA TRANSMISSION THROUGH AUDIO WAVES

(71) Applicant: Jio Platforms Limited, Ahmedabad (IN)

(72) Inventors: Venkateshwaran Mahadevan, Tamil Nadu (IN); Bhupendra Sinha, Maharashtra (IN); Gaurav Duggal, Telangana (IN); Sameer Mehta, Maharashtra (IN); Manoj Kumar Garg, Madhya Pradesh (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 245 days.

(21) Appl. No.: 17/708,738

(22) Filed: Mar. 30, 2022

(65) Prior Publication Data
US 2022/0319525 A1 Oct. 6, 2022

(30) Foreign Application Priority Data
Mar. 30, 2021 (IN) .............................. 202121014162

(51) Int. Cl.
*G10L 25/21* (2013.01)
*H04B 11/00* (2006.01)

(52) U.S. Cl.
CPC .............. *G10L 25/21* (2013.01); *H04B 11/00* (2013.01)

(58) Field of Classification Search
None
See application file for complete search history.

(56) References Cited

U.S. PATENT DOCUMENTS

| | | | |
|---|---|---|---|
| 9,814,400 B1* | 11/2017 | Cendrillon | A61B 5/7221 |
| 10,147,433 B1* | 12/2018 | Bradley | G10L 19/018 |
| 2002/0107691 A1* | 8/2002 | Kirovski | G10L 19/018 |
| | | | 704/E19.009 |
| 2004/0145661 A1* | 7/2004 | Murakami | H04N 1/32144 |
| | | | 348/222.1 |
| 2010/0057231 A1* | 3/2010 | Slater | G10L 19/018 |
| | | | 700/94 |
| 2014/0105448 A1* | 4/2014 | Srinivasan | G10L 19/018 |
| | | | 382/100 |

(Continued)

*Primary Examiner* — Walter F Briney, III
(74) *Attorney, Agent, or Firm* — FINNEGAN, HENDERSON, FARABOW, GARRETT & DUNNER LLP

(57) ABSTRACT

The present disclosure relates to a system and method for facilitating error-free communication of data by enabling transfer of data over audio signal in near-ultra sonic frequencies with specially designed audio emitted using a mixture of frequencies to achieve maximum stability. The method may include randomized emission of data bits over a plurality of frequency ranges to allow temporal and frequency voting. The audio signal transmitted may be received by pre-processing the received audio signal to remove unused frequency bands and unwanted audio artifacts introduced during transmission. The pre-processed audio signal may be further applied with a plurality of audio processing levels to denoise, smoothen the audio signal by going through noise subtraction using unique noise profiles and spectrally gate using curated thresholds. The audio signal may be then demodulated using a unique confidence score based on the power of all the frequencies emitted to find the data transmitted.

26 Claims, 11 Drawing Sheets

(56) References Cited

U.S. PATENT DOCUMENTS

2014/0267907 A1* 9/2014 Downes ........... H04N 21/43072
           348/525
2022/0150306 A1* 5/2022 Kumar ................... G16Y 40/35

* cited by examiner

500 ⟶

|   | $2^3$ | $2^2$ | $2^1$ |   | $2^0$ |   |   |
|---|---|---|---|---|---|---|---|
|   | b7 | b6 | b5 | b4 | b3 | b2 | b1 |
| 0 | 0 | 0 | 0 | 0 | 0 | 0 | 0 |
| 1 | 0 | 0 | 0 | 0 | 1 | 1 | 1 |
| 2 | 0 | 0 | 1 | 1 | 0 | 0 | 1 |
| 3 | 0 | 0 | 1 | 1 | 1 | 1 | 0 |
| 4 | 0 | 1 | 0 | 1 | 0 | 1 | 0 |
| 5 | 0 | 1 | 0 | 1 | 1 | 0 | 1 |
| 6 | 0 | 1 | 1 | 0 | 0 | 1 | 1 |
| 7 | 0 | 1 | 1 | 0 | 1 | 0 | 0 |
| 8 | 1 | 0 | 0 | 1 | 0 | 1 | 1 |
| 9 | 1 | 0 | 0 | 1 | 1 | 0 | 0 |

510 ⟶

SYSTEM AND METHOD FOR FACILITATING DATA TRANSMISSION THROUGH AUDIO WAVES

RESERVATION OF RIGHTS

A portion of the disclosure of this patent document contains material which is subject to intellectual property rights such as, but are not limited to, copyright, design, trademark, IC layout design, and/or trade dress protection, belonging to Jio Platforms Limited (JPL) or its affiliates (herein after referred as owner). The owner has no objection to the facsimile reproduction by anyone of the patent document or the patent disclosure, as it appears in the Patent and Trademark Office patent files or records, but otherwise reserves all rights whatsoever. All rights to such intellectual property are fully reserved by the owner.

FIELD OF INVENTION

The embodiments of the present disclosure generally relate to system and methods that facilitate transmission of data through audio waves. More particularly, the present disclosure relates to a system and method for facilitating transmission of data in the ultrasonic range or near-ultrasonic range that are capable of being emitted and received by everyday smart computing devices.

BACKGROUND OF THE INVENTION

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

Data transfer through ultrasonic/near-ultrasonic frequency range is not a widely used technology, currently available technology uses near-ultrasonic frequency ranges to transfer data for multiple use cases. The method modifies the carrier audio and adds artificial echoes to it. The human brain perceives these as natural echoes and just ignores them as if there are a few insignificant objects that bounces the original sound. Sound code is a family of techniques to embed data into sound waves. A carrier audio—which may be music or even simple speech—hosts the extra data and people should only be able to pick up the carrier audio and won't recognize the presence of the sound code inside it. The technique is analogous to the way colour printers insert tiny yellow dots in each printed page to identify the printer's serial number.

But using sound wave is also vulnerable as short range data transmission, is especially easily affected by environmental noise and causes data distortion or loss. Moreover, data is transferred from devices to devices through signals that have a very high frequency, the data is modulated into the signal using special techniques and emitted through highly powered towers into the atmosphere or is transferred through special coaxial or optical cables. Special equipment are therefore required to receive the signal and the demodulation of the signal into the data that is required.

There is therefore a need in the art to provide a system and a method that can facilitate transmission of data through audio waves in the ultrasonic range or near-ultrasonic range that are capable of being emitted and received by everyday smart computing devices in any noisy environment.

OBJECTS OF THE PRESENT DISCLOSURE

Some of the objects of the present disclosure, which at least one embodiment herein satisfies are as listed herein below.

An object of the present disclosure is to provide for a system and method to facilitate transfer of data using ultrasonic or near-ultrasonic audio waves to allow ease and a universally easy method of broadcasting data, transferring data and receiving data.

An object of the present disclosure is to provide for a system and method to facilitate emission of data that is robust and resistant to the noise inherently present in the transmission medium.

An object of the present disclosure is to provide for a system and method to facilitate processing of data by applying spectral gating in-order to make it robust and resistant to the noise inherently present in the transmission medium.

An object of the present disclosure is provide for a system and method to facilitate processing of data by applying noise reduction in-order to make it robust and resistant to the noise inherently present in the transmission medium.

An object of the present disclosure is provide for a system and method to facilitate real time decoding of the code.

An object of the present disclosure is provide for a system and method to facilitate code-found stopping criterion to stop capturing the audio signal once the code is decoded.

SUMMARY

This section is provided to introduce certain objects and aspects of the present invention in a simplified form that are further described below in the detailed description. This summary is not intended to identify the key features or the scope of the claimed subject matter.

In order to achieve the aforementioned objectives, the present disclosure provides a system and method for facilitating transmission of data through audio waves in the ultrasonic range or near-ultrasonic range that are capable of being emitted and received by everyday smart computing devices. In an aspect, the proposed system is configured to facilitate error-free communication of data. The system may include a control engine comprising a processor, the processor operatively coupled with a memory that may store instructions executable by the processor to: receive, from a transmitting device, an audio signal having a code, the code corresponding to bits associated with data transmitted by the transmitting device. The processor may cause the system to facilitate demodulation of the received audio signal by generating an aggregate sum of plurality of frequencies and temporal voting to generate a confidence score based on power of the plurality of frequencies pertaining to any near-ultrasonic and ultrasonic frequency range and based on the demodulation and the generated confidence score, extract, the bits from the demodulated audio signal to obtain the code.

In an embodiment, the control engine coupled to the transmitting device may be configured to generate the code associated with the data to be transmitted.

In an embodiment, the control engine may facilitate binarization of the code by getting the code as a symbol with each symbol corresponding to at least a 3-bit binary code by using a dictionary of predefined bits corresponding to each symbol. The control engine may further facilitate modulation of the binarized code by transforming the binarized code into an audio signal in the near-ultrasonic and ultrasonic frequency range. The bits of the binarized code may be randomized over a plurality of frequencies pertaining to said near-ultrasonic or said ultrasonic frequency range.

In an embodiment, an error correction engine pertaining to the control engine may be configured to introduce redundancy and randomize the bits associated with the code to be transmitted across time and a plurality of frequencies by applying error correction code to the code and wherein the redundant and randomized bits may be modulated into a plurality of frequencies for providing additional redundancy and minimizing errors.

In an embodiment, the error correction engine pertaining to the control engine coupled to a receiving device may be configured to de-randomize and correct errors to remove redundancy and randomness required for obtaining correct code from the audio signal received by the receiving device.

In an embodiment, the audio signal may be transmitted separately or by embedding with other audio signals.

In an embodiment, a pre-processing engine pertaining to the control engine may be configured to clean up and reduce noise in the audio signal received before demodulation of the audio signal takes place.

In an embodiment, the pre-processing engine may smoothen the audio signal received through noise subtraction using pre-defined noise profiles and spectral gating with predefined threshold frequencies.

In an embodiment, the pre-processing engine may be configured to split the received audio signal into a plurality timeframes and generate a spectrogram of the audio signal over the plurality of time frames to obtain distribution of frequencies and the power of the frequencies.

In an embodiment, spectral gating with the predefined threshold frequencies may be applied to remove frequencies having power below the pre-defined threshold.

In an embodiment, the pre-processing engine may be configured to identify dominant frequencies in each timeframe of the plurality of timeframes by using said confidence scores and wherein bits pertaining to the audio signal of each timeframe having maximum confidence score may be determined as the correct bits extracted.

In an embodiment, the dominant frequencies in each time frame may be determined through the aggregate sum of plurality of frequencies and temporal voting, wherein temporal voting may correspond to voting of number of occurrences of a repeating frequency over the time frame.

In an embodiment, the correct extracted bits may be de-binarized to obtain the data transmitted.

The present disclosure further provides for a method for facilitating error-free communication of data. The method may include the steps of receiving, from a transmitting device, an audio signal having a code, wherein the code may correspond to bits associated with data transmitted by the transmitting device. Further, the method may include the step of facilitating, by the control engine, demodulation of the received audio signal by processing an aggregate sum of the plurality of frequencies and temporal voting to generate a confidence score based on power of the plurality of frequencies pertaining to any near-ultrasonic and ultrasonic frequency range, and based on the demodulation and the generated confidence score, the method may include the step of extracting, the bits from the demodulated audio signal to obtain the code.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

The foregoing shall be more apparent from the following more detailed description of the invention.

DETAILED DESCRIPTION OF INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

The present invention provides a robust and effective solution to an entity or an organization by enabling transfer of data over audio signal in near-ultra sonic frequencies with specially designed audio emitted using a mixture of frequencies to achieve maximum stability. The method may include randomized emission of data bits over a plurality of frequency ranges to allow temporal and frequency voting. The audio signal transmitted may be received by pre-processing the received audio signal to remove unused frequency bands and unwanted audio artifacts introduced during transmission. The pre-processed audio signal may be further applied with a plurality of audio processing levels to denoise, smoothen the audio signal by going through noise subtraction using unique noise profiles and spectrally gate using curated thresholds. The audio signal may be then demodulated using a unique confidence score based on the power of all the frequencies emitted to find the data transmitted.

Figure 1:
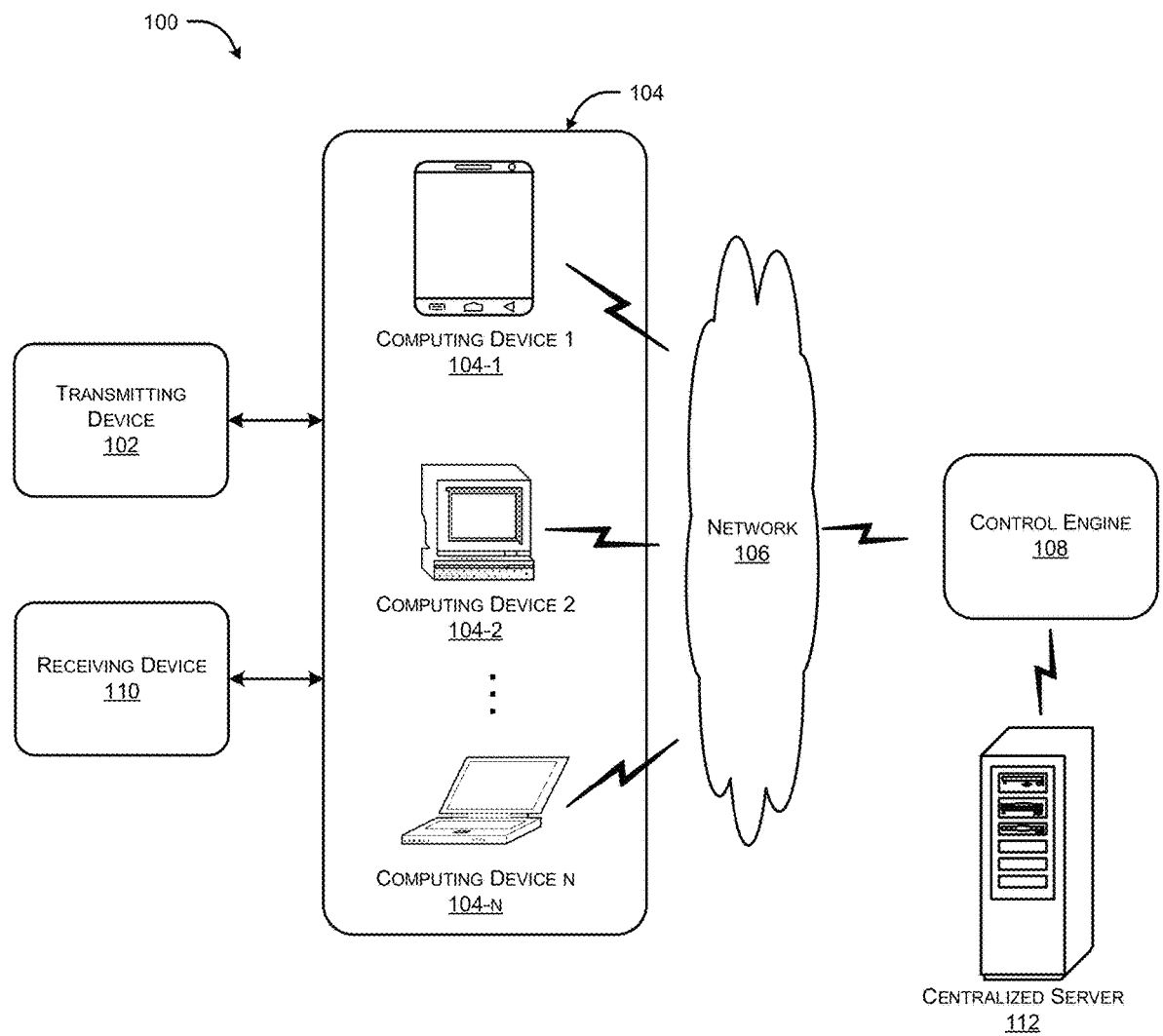
FIG. 1 illustrates an exemplary network architecture in which or with which the system of the present disclosure can be implemented for error-free data communication in accordance with an embodiment of the present disclosure.

Referring to FIG. 1 that illustrates an exemplary network architecture (100) in which or with which control engine (108) of the present disclosure can be implemented, in accordance with an embodiment of the present disclosure. As illustrated, the exemplary architecture (100) includes a control engine (108) for facilitating error-free data communication. The control engine (108) may receive an audio signal embedded with a code from a transmitting device (102) coupled to one or more computing devices 104 (also referred collectively as computing devices 104 and individually as computing device 104). The computing device (104) may also be coupled to a receiving device (110) to receive the audio signal in the ultrasonic or near ultrasonic frequency range embedded with the code. In an embodiment, the code embedded in the audio signal may correspond to bits associated with data transmitted by the transmitting device (102). The control engine (108) may facilitate demodulation of the received audio signal by processing an aggregate sum of plurality of frequencies and temporal voting to generate a confidence score based on power of the plurality of frequencies pertaining to any near-ultrasonic and ultrasonic frequency range and based on the demodulation and the generated confidence score, the control engine may extract, the bits from the demodulated audio signal to obtain the code.

In an embodiment, the control engine (108) may generate the code associated with the data to be transmitted through the transmitting device (102). The control engine may at first binarize the code by getting the code as a symbol with each symbol corresponding to at least a 3-bit binary code. Then, using a dictionary of predefined bits corresponding to each symbol, the string of symbols may be binarized. The binarized code may be then modulated by transforming the code into an audio signal in the near-ultrasonic and ultrasonic frequency range. The bits of the binarized code may be randomized over a plurality of frequencies pertaining to the near-ultrasonic or the ultrasonic frequency range. The control engine may introduce redundancy and randomize the bits associated with the code to be transmitted across time and a plurality of frequencies by applying error correction code to the code. The redundant and randomized bits may be modulated into a plurality of frequencies for providing additional redundancy and minimizing errors. The control engine (108) coupled to the receiving device (110) may be further configured to de-randomize and correct errors to remove redundancy and randomness required for obtaining correct code from the audio signal received by the receiving device (110).

In an embodiment, the audio signal may be transmitted separately or by embedding with other audio signals.

Furthermore, in an embodiment, the control engine (108) may be configured to pre-process the audio signal by cleaning up and reducing noise in the audio signal received before demodulation of the audio signal takes place. The control engine (108) may further smoothen the audio signal received by another pre-processing technique such as noise subtraction using pre-defined noise profiles and spectral gating with predefined threshold frequencies but not limited to the like. The control engine may be further configured to split the received audio signal into a plurality timeframes and generate a spectrogram of the audio signal over the plurality of time frames to obtain distribution of frequencies and the power of the frequencies.

In an embodiment, spectral gating with the predefined threshold frequencies may be applied to remove frequencies having power below the pre-defined threshold. The control engine (108) may be configured to identify dominant frequencies in each timeframe of the plurality of timeframes by using the confidence scores and the bits pertaining to the audio signal of each timeframe having maximum confidence score may be determined as the correct bits extracted.

In an embodiment, the dominant frequencies in each time frame may be determined through the aggregate sum of plurality of frequencies and temporal voting but not limited to the like. The temporal voting may correspond to voting of number of occurrences of a repeating frequency over the time frame.

In an embodiment, the correct extracted bits may be de-binarized to obtain the code transmitted.

In an embodiment, the computing device (104) and/or the transmitting device (102) and the receiving device (110) may communicate with the control engine (108) via set of executable instructions residing on any operating system, including but not limited to, Android™, iOS™, Kai OS™ and the like. In an embodiment, computing device (104) and/or the transmitting (102) and receiving device (110) may include, but not limited to, any electrical, electronic, electromechanical or an equipment or a combination of one or more of the above devices such as mobile phone, smartphone, virtual reality (VR) devices, augmented reality (AR) devices, laptop, a general-purpose computer, desktop, personal digital assistant, tablet computer, mainframe computer, or any other computing device, wherein the computing device may include one or more in-built or externally coupled accessories including, but not limited to, a visual aid device such as camera, audio aid, a microphone, a keyboard, input devices for receiving input from a user such as touch pad, touch enabled screen, electronic pen, receiving devices for receiving any audio or visual signal in any range of frequencies and transmitting devices that can transmit any audio or visual signal in any range of frequencies. It may be appreciated that the computing device (104) and/or the transmitting (102) and the receiving device (110) may not be restricted to the mentioned devices and various other devices may be used. A smart computing device may be one of the appropriate systems for storing data and other private/sensitive information.

Figure 2:
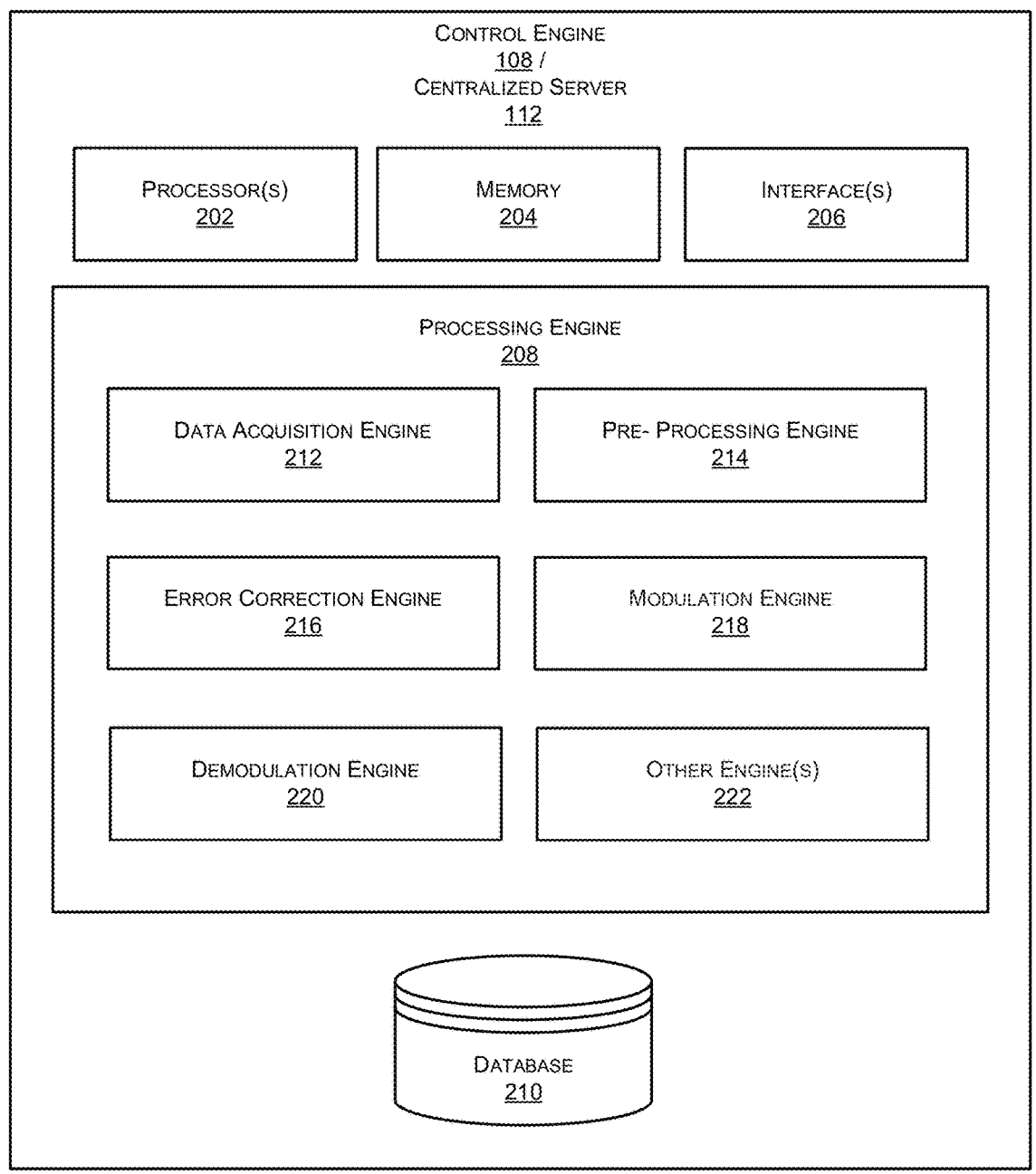
FIG. 2 illustrates an exemplary representation of a control engine or a centralized server for error-free data communication, in accordance with an embodiment of the present disclosure.

In an embodiment, the control engine (108) may include one or more processors coupled with a memory, wherein the memory may store instructions which when executed by the one or more processors may cause the system to facilitate error-free communication of data. FIG. 2 with reference to FIG. 1, illustrates an exemplary representation of control engine (108)/centralized server (112) for facilitating self-generation of an entity-specific bot through which one or more automated visual responses to an end-user query are transmitted based on a machine learning based architecture, in accordance with an embodiment of the present disclosure. In an aspect, the control engine (108)/centralized server (112) may comprise one or more processor(s) (202). The one or more processor(s) (202) may be implemented as one or more microprocessors, microcomputers, microcontrollers, digital signal processors, central processing units, logic circuitries, and/or any devices that process data based on operational instructions. Among other capabilities, the one or more processor(s) (202) may be configured to fetch and execute computer-readable instructions stored in a memory (204) of the control engine (108). The memory (204) may be configured to store one or more computer-readable instructions or routines in a non-transitory computer readable storage medium, which may be fetched and executed to create or share data packets over a network service. The memory (204) may comprise any non-transitory storage device including, for example, volatile memory such as RAM, or non-volatile memory such as EPROM, flash memory, and the like.

In an embodiment, the control engine (108)/centralized server (112) may include an interface(s) 206. The interface(s) 206 may comprise a variety of interfaces, for example, interfaces for data input and output devices, referred to as I/O devices, storage devices, and the like. The interface(s) 206 may facilitate communication of the control engine (108). The interface(s) 206 may also provide a communication pathway for one or more components of the control engine (108) or the centralized server (112). Examples of such components include, but are not limited to, processing engine(s) 208 and a database 210.

The processing engine(s) (208) may be implemented as a combination of hardware and programming (for example, programmable instructions) to implement one or more functionalities of the processing engine(s) (208). In examples described herein, such combinations of hardware and programming may be implemented in several different ways. For example, the programming for the processing engine(s) (208) may be processor executable instructions stored on a non-transitory machine-readable storage medium and the hardware for the processing engine(s) (208) may comprise a processing resource (for example, one or more processors), to execute such instructions. In the present examples, the machine-readable storage medium may store instructions that, when executed by the processing resource, implement the processing engine(s) (208). In such examples, the control engine (108)/centralized server (112) may comprise the machine-readable storage medium storing the instructions and the processing resource to execute the instructions, or the machine-readable storage medium may be separate but accessible to the control engine (108)/centralized server (112) and the processing resource. In other examples, the processing engine(s) (208) may be implemented by electronic circuitry.

The processing engine (208) may include one or more engines selected from any of a data acquisition engine (212), a pre-processing engine (214), an error correction engine (216), modulation engine (218), demodulation engine (220) and other engines (222). In an embodiment, the data acquisition engine (212) of the control engine (108) can receive an audio signal from a transmitting device (102). The audio signal may be embedded with a code that may correspond to bits associated with data transmitted by the transmitting device (102).

The audio signal before being transmitted undergoes a series of processing steps performed by the control engine (108) coupled to the transmitting device (102). The control engine (108) coupled to the transmitting device may be configured to generate the code associated with data to be transmitted.

The pre-processing engine (214) pertaining to the control engine (108) coupled to the transmitting device (102) may facilitate binarization of the code by getting the code as a symbol with each symbol corresponding to at least a 3-bit binary code by using a dictionary of predefined bits corresponding to each symbol, wherein the pre-processing engine (214) further may facilitate modulation of the binarized code by transforming the code into an audio signal in said near-ultrasonic and ultrasonic frequency range. The bits of the binarized code may be randomized over a plurality of frequencies pertaining to the near-ultrasonic or the ultrasonic frequency range.

The error correction engine (216) pertaining to the control engine (108) may be configured to introduce redundancy and randomize the bits associated with the data to be transmitted across time and a plurality of frequencies by applying error correction code to the code. The redundant and randomized bits may be modulated into a plurality of frequencies for providing additional redundancy and minimizing errors by the modulation engine (218).

The error correction engine (216) pertaining to the control engine (108) coupled to a receiving device (110) may be configured to de-randomize and correct errors to remove redundancy and randomness required for obtaining correct code from the data transmitted.

The pre-processing engine (214) pertaining to the control engine (108) associated with the receiving device (110) configured to clean up and reduce noise in the audio signal received before demodulation of the audio signal takes place by the demodulation engine (220). The pre-processing engine (214) may further smoothen the audio signal received through noise subtraction using pre-defined noise profiles and spectral gating with predefined threshold frequencies. The pre-processing engine (214) may be configured to split the received audio signal into a plurality timeframes and generate a spectrogram of the audio signal over the plurality of time frames to obtain distribution of frequencies and the power of the frequencies. The spectral gating with the predefined threshold frequencies may be applied to remove frequencies having power below the pre-defined threshold frequencies. The pre-processing engine (214) may be further configured to identify dominant frequencies in each timeframe of the plurality of timeframes by using the confidence scores and bits pertaining to the audio signal of each timeframe having maximum confidence score may be determined as the correct bits extracted.

The demodulation engine (220) may be configured to determine the dominant frequencies in each time frame through the aggregate sum of plurality of frequencies and temporal voting. The temporal voting may correspond to voting of number of occurrences of a repeating frequency over the time frame. The demodulation engine (220) may further be configured to correct the extracted bits and de-binarized to obtain the code transmitted.

In an embodiment, real time decoding of the code may be performed by the control engine (108) coupled to the computing device (104) associated with the receiving device (110).

In an embodiment, the control engine (108) may be inside the computing device (104) associated with the receiving device (110) but not limited to it.

In an embodiment, the audio signal may be acquired in real-time by the data acquisition engine (212) at the same time as the audio signal is being processed in real-time. The audio signal may be fed as a stream of data. When a first stream of data pertaining to the stream of data is being sent, a save state may be initialized where the data saved in the saved state may be subsequently stored for the run of the control engine (108). The control engine (108) may store the state of the control engine (108) for every packet of the stream to keep persistent storage of the states between every packet.

In an embodiment, in every state the confidence scores may be aggregated and the average of the confidence scores may be used as a stopping criterion to decide if the code has been found. If the code has been found the audio signal may be asked to stop capturing further, other-wise the data acquisition engine (212) may be configured to continue capturing audio to further process and demodulate. The audio signal that may be used to demodulate may be based on whether the audio signal is being stopped either by the control engine (108) or an arbitrary time.

Figure 3:
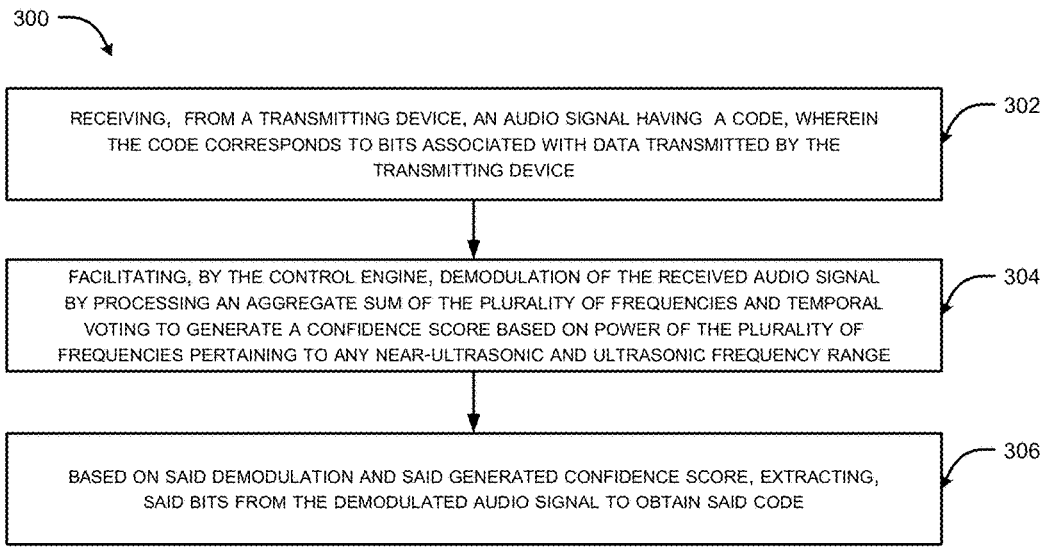
FIG. 3 illustrates an exemplary flow diagram representation depicting error-free communication of data, in accordance with an embodiment of the present disclosure.

FIG. 3 illustrates an exemplary flow diagram representation of the proposed method (300) depicting error-free communication of data, in accordance with an embodiment of the present disclosure.

The present disclosure further provides for the method (300) for facilitating error-free communication of data. The method (300) may include at 302 the step of receiving, from a transmitting device, an audio signal having a code, wherein the code may correspond to bits associated with data transmitted by the transmitting device. Further, the method may include at 304 the step of facilitating, by the control engine, demodulation of the received audio signal by processing an aggregate sum of the plurality of frequencies and temporal voting to generate a confidence score based on power of the plurality of frequencies pertaining to any near-ultrasonic and ultrasonic frequency range, and based on the demodulation and the generated confidence score, the method may include at 306, the step of extracting, the bits from the demodulated audio signal to obtain said code.

In an embodiment, the method 300 may further include generating the code associated with the data to be transmitted by the control engine coupled to the transmitting device.

In an embodiment, the method 300 may further include binarization of the code by getting the code as a symbol with each symbol corresponding to at least a 3-bit binary code by using a dictionary of predefined bits corresponding to each symbol, and further facilitating modulation of the binarized code by transforming the binarized code into an audio signal in the near-ultrasonic and ultrasonic frequency range, wherein the bits of the binarized code are randomized over a plurality of frequencies pertaining to the near-ultrasonic or the ultrasonic frequency range.

In an embodiment, the method 300 may further include transmitting the audio signal separately or by embedding with other audio signals.

In an embodiment, the method 300 may further include configuring an error correction engine pertaining to the control engine coupled to the transmitting device to introduce redundancy and randomize said bits pertaining to the data to be transmitted across time and a plurality of frequencies by applying error correction code to the data and wherein the redundant and randomized bits may be modulated into a plurality of frequencies for providing additional redundancy and minimizing errors.

In an embodiment, the method 300 may further include configuring the error correction engine pertaining to the control engine coupled to the receiving device to de-randomize and correct errors to remove redundancy and randomness required for obtaining correct code in the receiving device.

In an embodiment, the method 300 may further include configuring a pre-processing engine pertaining to the control engine to clean up and reduce noise in the audio signal received before demodulation.

In an embodiment, the method 300 may further include configuring the pre-processing engine to smoothen the audio signal received through noise subtraction using pre-defined noise profiles and spectral gating with predefined threshold frequencies.

In an embodiment, the method 300 may further include configuring the pre-processing engine to split the received audio signal into a plurality timeframes and generate a spectrogram of the said audio signal over the plurality of time frames to obtain distribution of frequencies and the power of said frequencies.

In an embodiment, the method 300 may further include applying spectral gating with the predefined threshold frequencies to remove frequencies having power below the pre-defined threshold frequencies.

In an embodiment, the method 300 may further include configuring the pre-processing engine to identify dominant frequencies in each timeframe of the plurality of timeframes by using the confidence scores and wherein bits pertaining to the audio signal of each timeframe having maximum confidence score may be determined as the correct bits extracted.

In an embodiment, the method 300 may further include determining the dominant frequencies in each time frame through said aggregate sum of plurality of frequencies and temporal voting, wherein temporal voting may correspond to voting of number of occurrences of a repeating frequency over the time frame.

In an embodiment, the method 300 may further include de-binarizing the correct extracted bits to obtain the data transmitted.

Figure 4A:
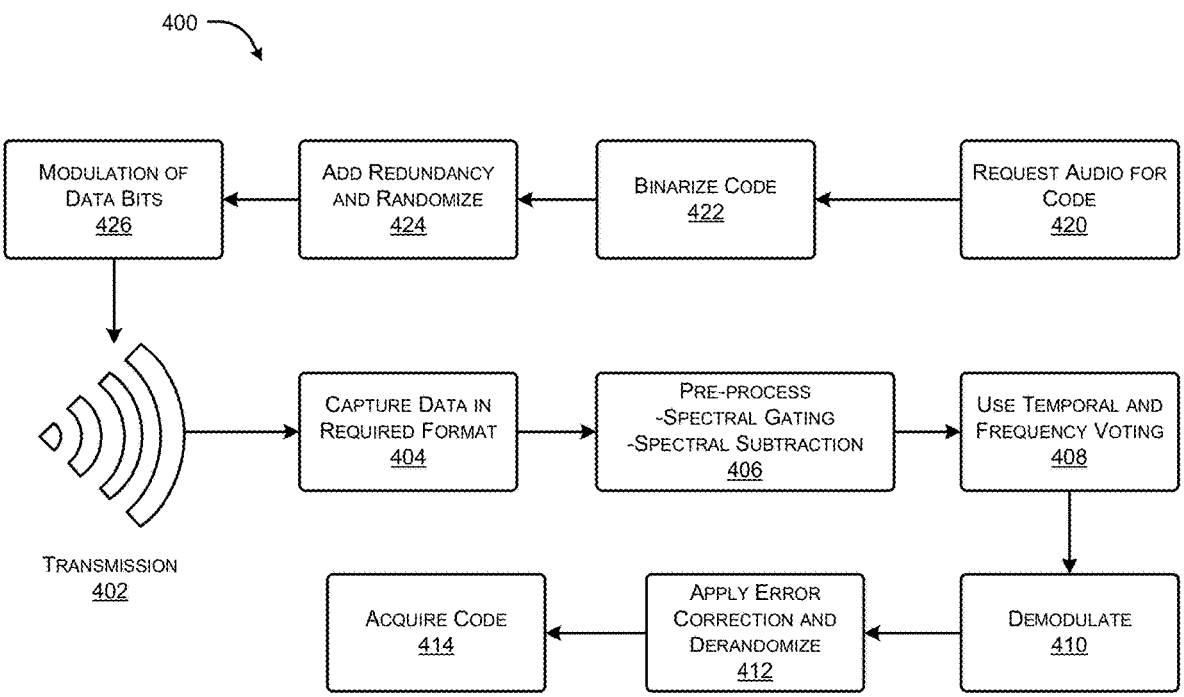
FIG. 4A-4B illustrate exemplary representations depicting components of the system architecture involved in facilitating transmission of data through audio waves in the ultrasonic range or near-ultrasonic range that may be capable of being emitted and received by everyday smart computing devices, in accordance with an embodiment of the present disclosure.
Figure 4B:
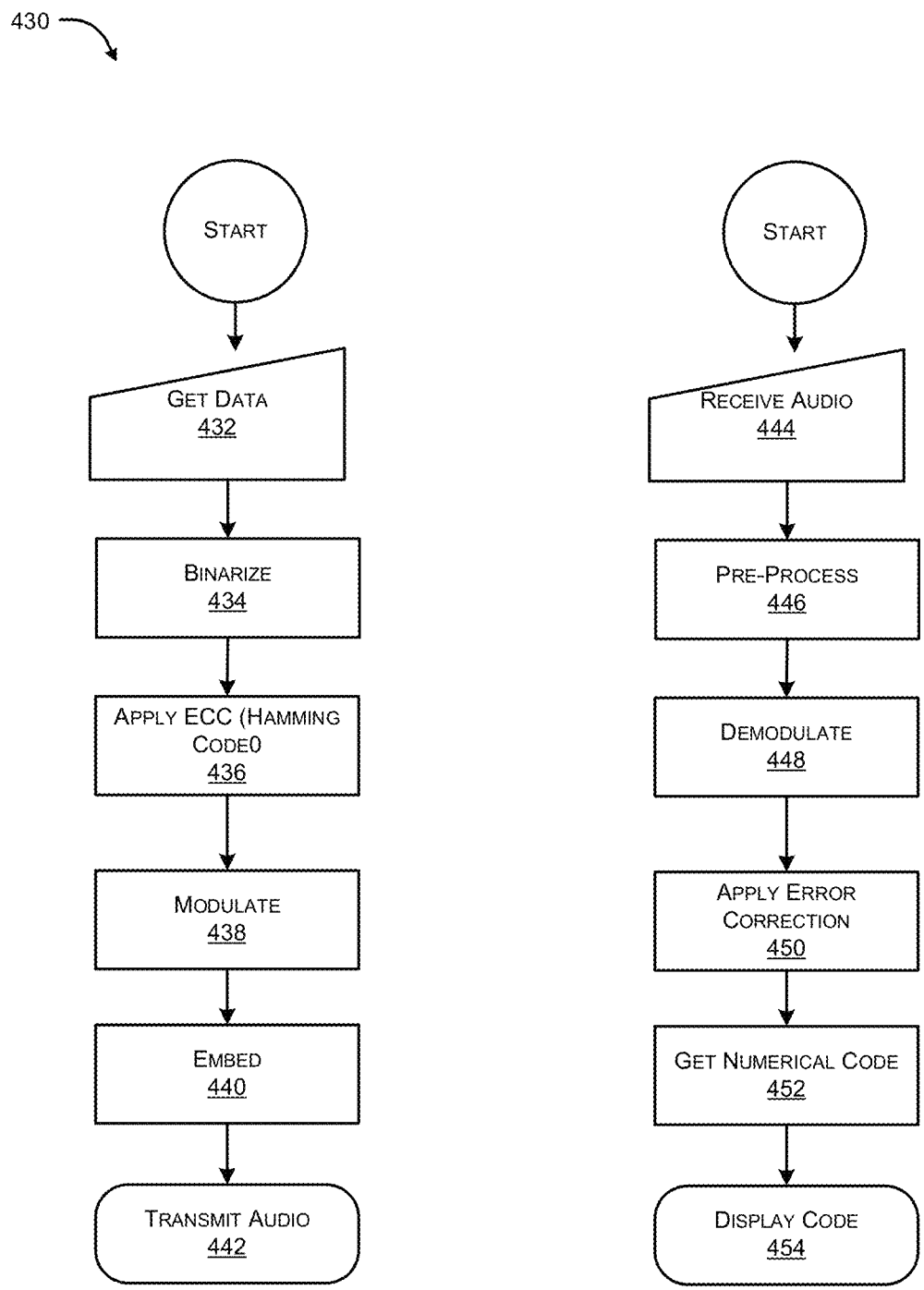

FIG. 4A-4B illustrate exemplary representations depicting components of the system architecture involved in facilitating transmission of data through audio waves in the ultrasonic range or near-ultrasonic range that may be capable of being emitted and received by everyday smart computing devices, in accordance with an embodiment of the present disclosure. FIG. 4A illustrates an exemplary system architecture. The system (400) at block 420 takes the code as an input to generate a corresponding audio. Then at block 422 the code may be binarized and at block 424, add redundancy and randomize the binarized. At block 426, the output of block 424 may be modulated by modulation of bits. The modulated data from 426 is sent for transmission at 402. The transmitted data may be captured in a required format at block 404. The output data from block 404 may be then pre-processed, may undergo spectral gating and spectral subtraction at block 406. The pre-processed data from block 406 may undergo temporal and frequency voting at block 408 for extraction of the data-bits from the audio. The output data from 408 may be demodulated at block 410. The demodulated data at block 410 may then be applied with error correction and derandomize at block 412 and at block 414 acquire the code.

FIG. 4B illustrates an exemplary flow diagram being processed in the system 100. The flow diagram may include a step of getting data (also referred to as code) at block 432. The data may be then binarized at block 434. In an exemplary embodiment, data binarization may be performed by getting the code as a symbol with each symbol corresponding to at least a 3-bit binary code. Then using a dictionary of predefined bits corresponding to each symbol, the string of symbols may be binarized. The output of block 424 may then undergo the step of applying error correction code at block 436 to introduce redundancy and may be randomized across time and frequencies to improve performance. In an exemplary embodiment, the error correction codes may be Hamming code, AN code, BCH code, which can be designed to correct any arbitrary number of errors per code block, Berger code, Constant-weight code, Convolutional code, Expander codes, Group codes, Golay codes but not limited to the like. The final data bits may then undergo the step of modulation at block 438 into at least three frequencies for additional redundancy and then may be embedded at block 440 for transmission at block 442.

In an exemplary embodiment, the data may be transmitted via (near)-Ultrasonic to be received via a smart device at block 444. The audio may be then pre-processed at block 446 to remove audio artifacts. The pre-processed received data may then undergo the step of demodulation at block 448. The demodulated data may further undergo step of applying error correction code at block 450 to obtain the numerical code at block 452 which may be then displayed at block 454.

In an exemplary embodiment, there may be at least four stages of data transfer. The at least four stages may include generation, transmission, receiving and processing but not limited to the like.

In another exemplary embodiment, there may be at least four stages of generation of data that may include data binarization, error correction code, modulation and binary frequency shift keying.

In an embodiment, data binarization may include restriction of numeric data to at least 3 bits to maximize utilization of bits and remove any redundancy coming from using 8-bits for the normally used ascii system. For example, 1421 after data binarization may become 001010010001 and 3017 may become 011000001111.

In an embodiment, error correction code may include insertion of bits into the Binarized data. The inserted bits are called parity bits. The parity bits may be redundant bits that may be used to mitigate errors caused during transmission. This may be done by inserting redundant bits such that even when there may be errors for example a 1 is identified as 0 or vice versa, they can be identified and corrected up to a certain limit in the number of errors. In an embodiment, error correction code may be applied to the data bits that may be received from data binarization and may be succeeded by modulation.

Figures 5A, 5B:
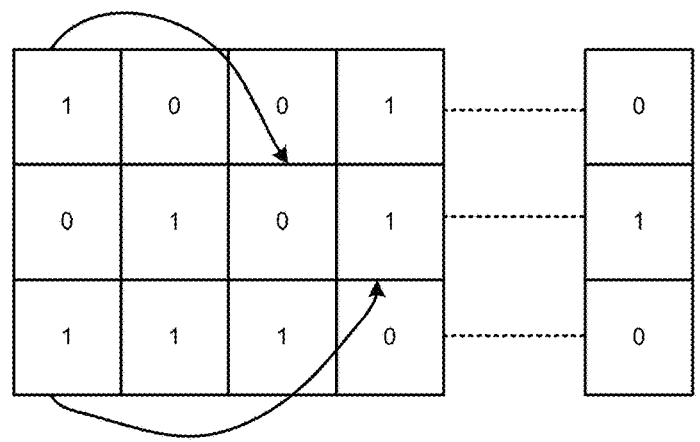
FIG. 5A illustrates an exemplary implementation of the proposed error correction code in accordance with an embodiment of the present disclosure.
FIG. 5B illustrates an exemplary implementation of data manipulation in accordance with an embodiment of the present disclosure.

FIG. 5A illustrates an exemplary implementation of the proposed error correction code in accordance with an embodiment of the present disclosure.

The error correction code illustrated in FIG. 5A is obtained by using the hamming code. As illustrated parity bits may be inserted at columns b7, b6, b5 and b3 and the remaining b4, b2 and b1 may be the binarized data.

FIG. 5B illustrates an exemplary implementation of data manipulation in accordance with an embodiment of the present disclosure.

As illustrated in FIG. 5B, in an embodiment, due to interference during transmission more protection may be required for the upkeep of transferred data, to have a better resistance to noise and improve upon the capabilities to resist noise. Therefore, the bits transferred may be randomly shuffled in a pre-determined manner similar to the data bits hopping between different frequencies.

In an embodiment, the bits received after applying error correction code may be then utilized to perform binary shift keying to transform into audio waves in the near-ultrasonic or ultrasonic frequency range.

Figure 5C:
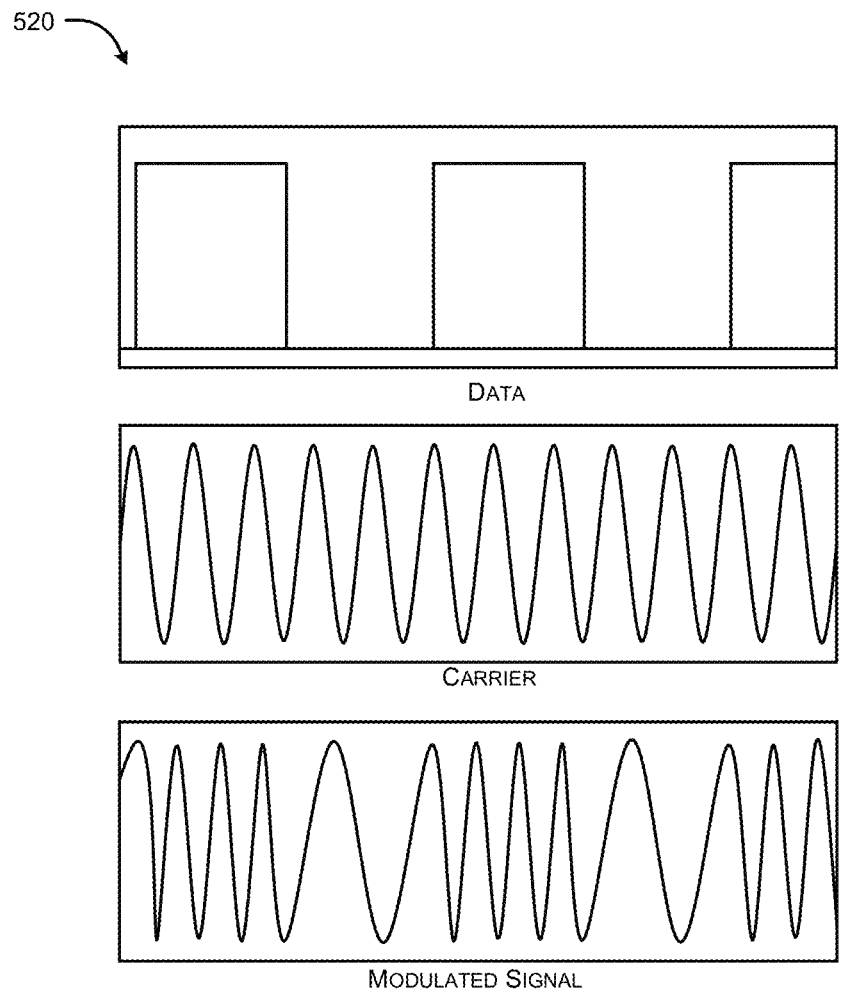
FIG. 5C illustrates exemplary representations of data, carrier and the modulated signal in accordance with an embodiment of the present disclosure.

FIG. 5C illustrates exemplary representations of data, carrier and the modulated signal in accordance with an embodiment of the present disclosure.

As illustrated in FIG. 5C, the data may be modulated with a high frequency carrier signal to generate the modulated signal that is in the near-ultrasonic or ultrasonic frequency range. After modulation an audio signal may be produced that may contain the data to be transferred. This audio may be used to transmit the data to allow another device to receive.

In an exemplary embodiment, the audio may be transmitted via any of the emitters like a dedicated speaker, television, radio, smart device but not limited to the like. The audio in the ultrasonic range could be embedded in other audios or could be played separately without being be heard by most people.

In an exemplary embodiment, the data in the form of an audio signal in the ultrasonic range may be received via a smart computing device integrated with a microphone to receive the audio data being transmitted. Once received, the audio may be sent for processing.

In an embodiment, the audio processing may include the following stages such as pre-processing, demodulation— Binary frequency shift keying using a plurality of frequencies, error correction code, but not limited to the like.

In an embodiment, pre-processing may be performed on the audio signal received in-order to clean up the audio signal to get better results during demodulation phase. The cleaning up may be performed in order to reduce noise and any sound artifacts. In an exemplary embodiment, the pre-processing may be done in at least 2 phases. A first phase may include removal of any noise below a certain threshold.

Figure 6A:
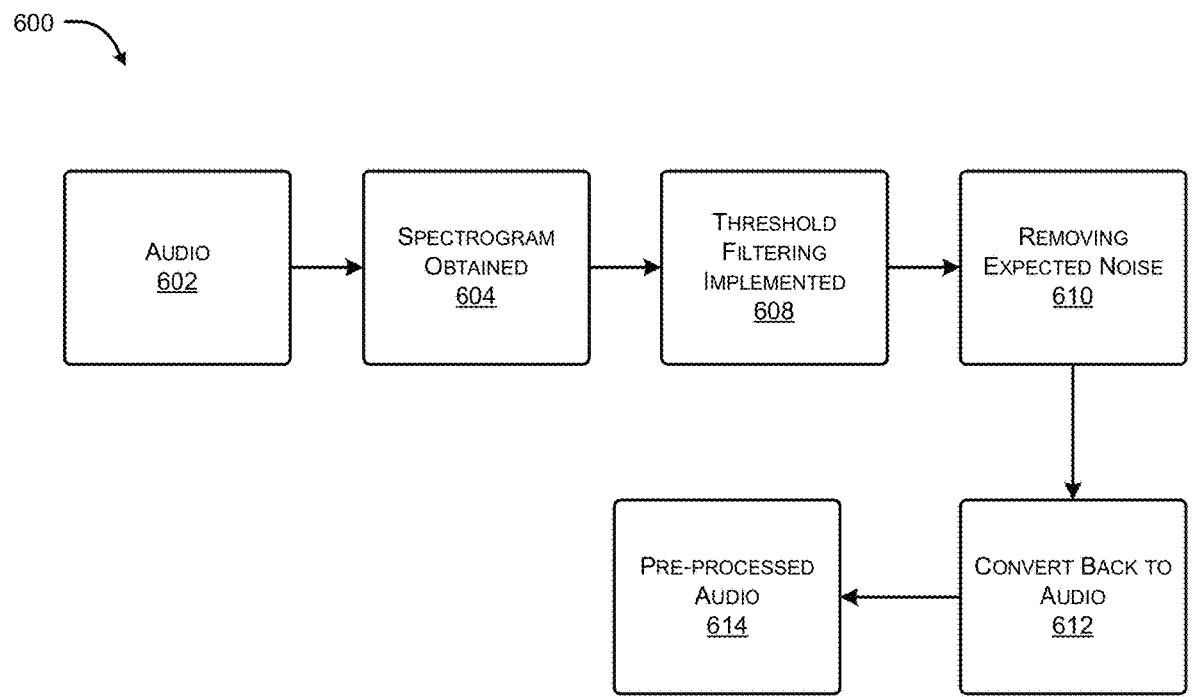
FIG. 6A illustrates an exemplary representation of a flow diagram highlighting steps followed in pre-processing in accordance with an embodiment of the present disclosure.

FIG. 6A illustrates an exemplary representation of a flow diagram highlighting steps followed in pre-processing in accordance with an embodiment of the present disclosure.

As illustrated in FIG. 6A, the pre-processing may include the step of receiving the audio signal at block 602. At block 604 a spectrogram may be obtained by applying Fast Fourier Transform (FFT) over small time frames of the audio signal to get the distribution of a plurality of frequencies of the audio signal and power of the plurality of the frequencies. At block 606, the pre-processing may include the step of implementation of threshold filtering. In an exemplary embodiment, the threshold may be acquired from experiments performed under pre-defined conditions to get the optimal threshold to get best performance. In another exemplary embodiment, the power may be calculated using the amplitudes split from the distribution of frequencies acquired from the FFT. The threshold acquired may be then utilized to filter out frequencies that have a power below a pre-determined threshold. This process from block 604 to block 606 may be repeated for all the complete audio signal for all the timeframes. The resultant spectrogram obtained at block 606 may be used for restoration of the power or the magnitude spectrum of the audio signal observed in additive noise, through subtraction of an estimate of the average noise spectrum from the noisy signal spectrum. In an exemplary embodiment, noise profiles may be initiated by using noise recorded in a plurality of environments to get noise profiles. The noise spectrum may be then estimated for intervals after the signals may be released, and accordingly the noise profiles may be updated. The noise profiles may be used to counteract the expected noise in the audio signal at block 608. Spectrogram data obtained may be then utilized to subtract the noise profile of the audio signal. The spectrogram data may bet converted back into audio signal by using inverse discrete Fourier transform at block 610 to obtain the pre-processed audio signal at block 612.

Figure 6B:
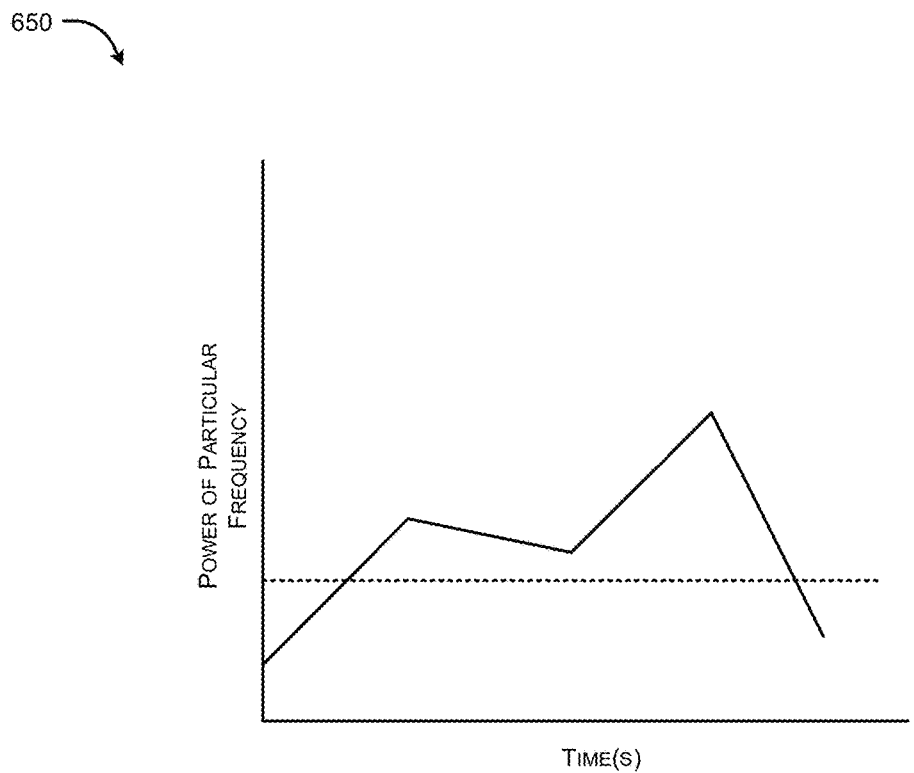
FIG. 6B illustrates an exemplary representation of a power spectral density function in accordance with an embodiment of the present disclosure.

FIG. 6B illustrates an exemplary representation of a power spectral density function in accordance with an embodiment of the present disclosure.

As illustrated in FIG. 6B, power of particular frequency may be defined in the y-axis while x-axis may include the time in milliseconds. The area between the x and y axis may give the power spectral density.

Figure 7:
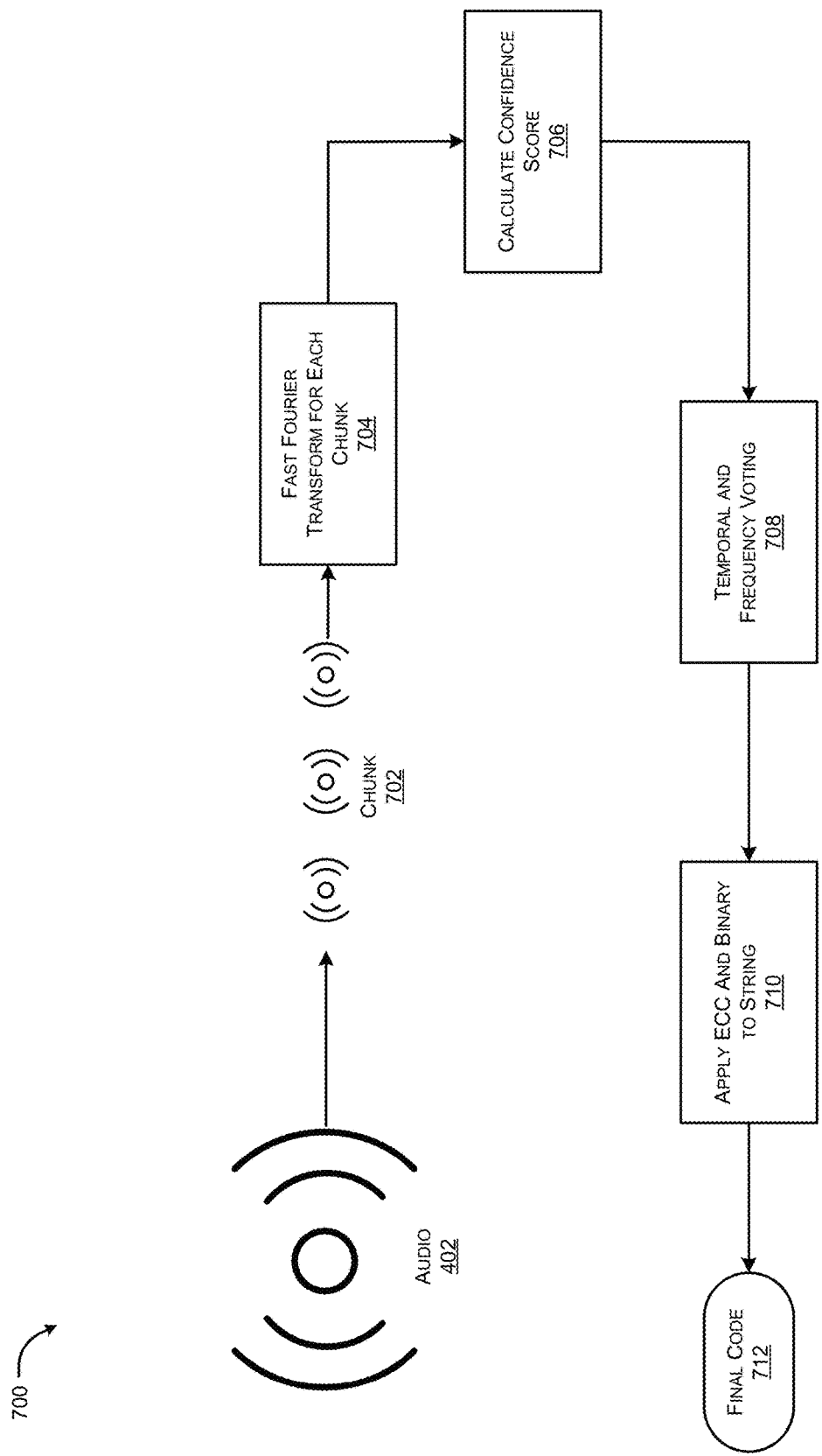
FIG. 7 illustrates an exemplary representation of a flow diagram of demodulation of the pre-processed audio signal in accordance with an embodiment of the present disclosure.

FIG. 7 illustrates an exemplary representation of a flow diagram of demodulation of the pre-processed audio signal in accordance with an embodiment of the present disclosure.

As illustrated in FIG. 7, in an embodiment, the pre-processed audio signal at block 402 may be used to obtain the data bits transmitted by splitting the received audio signal into timeframes (also referred to as chunks) at block 702 and applying fast Fourier transform in each time frame (also referred to as chunk) at block 704. Bin (1 or 0) with maximum confidence score may be then assigned to each chunk at block 706. The resultant amplitudes may be used to find the dominant frequency in each timeframe by using both temporal and frequency confidence scores at block 708. The data may be then passed through error correction code and binary to string conversion may take place at block 710 obtain as the received bit and may be performed across all the timeframes to receive the entire transmitted data at block 712.

Figure 8A:
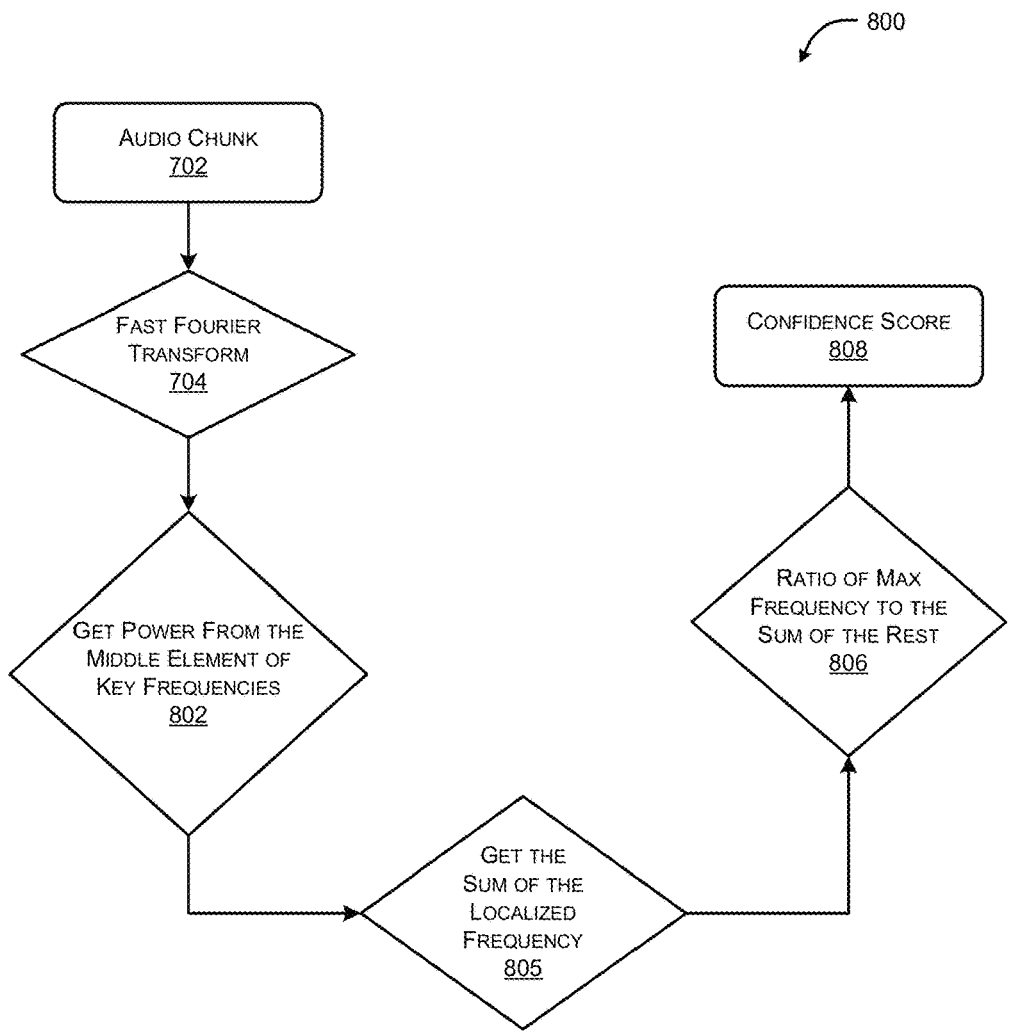
FIG. 8A-8B illustrate exemplary representations of calculating the confidence score in accordance with an embodiment of the present disclosure.
Figure 8B:
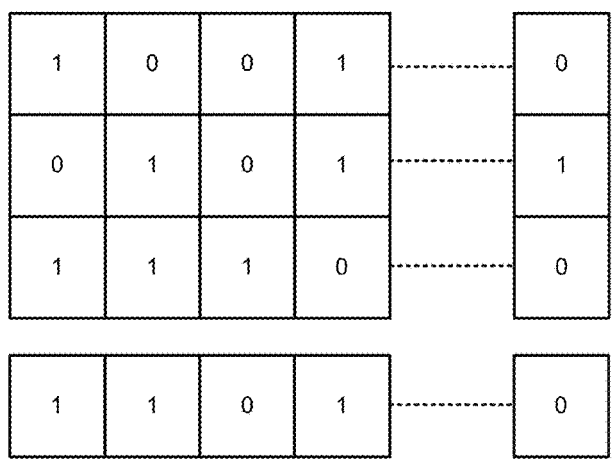

FIG. 8A-8B illustrate exemplary representations of calculating the confidence score in accordance with an embodiment of the present disclosure.

As illustrated in FIG. 8A, chunks of audio signal sized equal to the size of the bits being sent may be used at block 702. For example, for audio signal of 20 bits/sec—each chunk may an audio signal may be of size 0.05 s. At block 704, FFT may be performed in each chunk of audio signal to calculate a spectrogram matrix to get the power of different frequencies. At block 802, power of the middle of key frequencies of each chunk may be obtained due to uncertain alignment of the actual audio and the audio signal extracted using chunks. In an exemplary embodiment, key frequencies may be defined as frequencies used in ultrasonic emitting that may be used as either data emitting or handshake frequencies. Channel-wise there may be at least 3 key frequencies. At block 804, the sum of the localized frequency power of the key frequencies may be obtained. In an exemplary embodiment, the sum of the powers of the key frequencies and the frequencies nearest to it may be assigned to the score for the key frequency. At block 806, a ratio of the power of the maximum frequency to the sum of the other frequencies for a pre-defined channel may be determined to obtain the confidence score at block 808.

In an embodiment, confidence score may be calculated by using $$\text{Confidence}(fi) = f\max / ((\Sigma_{i=1}^{n} fi) - f\max)$$

where fi are the localised sum of powers of the frequencies of a channel, fmax is the highest power.

In an embodiment, temporal value of confidence score may be given by $$\text{temporal}(\text{Confidence}_i) = (\Sigma_{i=1}^{n} \text{sign}(\text{Confidence}_i) \sqrt{\text{abs}(\text{Confidence}_i)})/n$$

where $\text{Confidence}_i$ is the confidence of the time-sequence I for the given bit.

In an embodiment, final data bit may be obtained by using $$\text{final}(\text{temporal}_i) = (\Sigma_{i=1}^{n} \text{temporal}_i) * w_i)$$

where $\text{temporal}_i$ is the confidence for the channel i for the given bit.

In an embodiment, frequency and temporal voting may be performed because transferring the data bits via ultrasonic audio can be considered to be unreliable. Hence to improve accuracy, redundancy can be applied. Redundancy may be obtained by sending same data over a plurality of frequencies and strength of each frequency of each channel may be utilized to get a score which may decide the bit transferred. Also, while receiving the audio signal a plurality of epochs of the audio signal may be recorded and may use powers of frequencies at respective positions in time to vote for the data bit in that position. The aggregate sum of frequency and temporal voting may be then used to find the data bit.

In an exemplary embodiment, the frequency and temporal voting may include the steps of assigning a sign to the confidence score based on the bit (0 or 1), using root mean square (RMS) of confidence score to judge integrity of the signal in a frame, getting the signed mean square root to get the temporal confidence score (voting) bit-wise, getting the weighted sum of bit-wise confidence scores weighted channel-wise after de-randomizing the bits which may be randomized independently and use the resultant confidence score array to determine the bytes including the ECC.

In an embodiment, the demodulated data bits may be then passed through error detection code using hamming codes but not limited to it to identify if any errors may have occurred during the transmission process. If any errors were found, then error correction may be applied to obtain the actual data.

In yet another embodiment, the final data bits may be then transferred back into the numerical values to get the transmitted data. For example, 110001111010 may be obtained as 6172 and 011001101100 may be obtained as 3154

Figure 9:
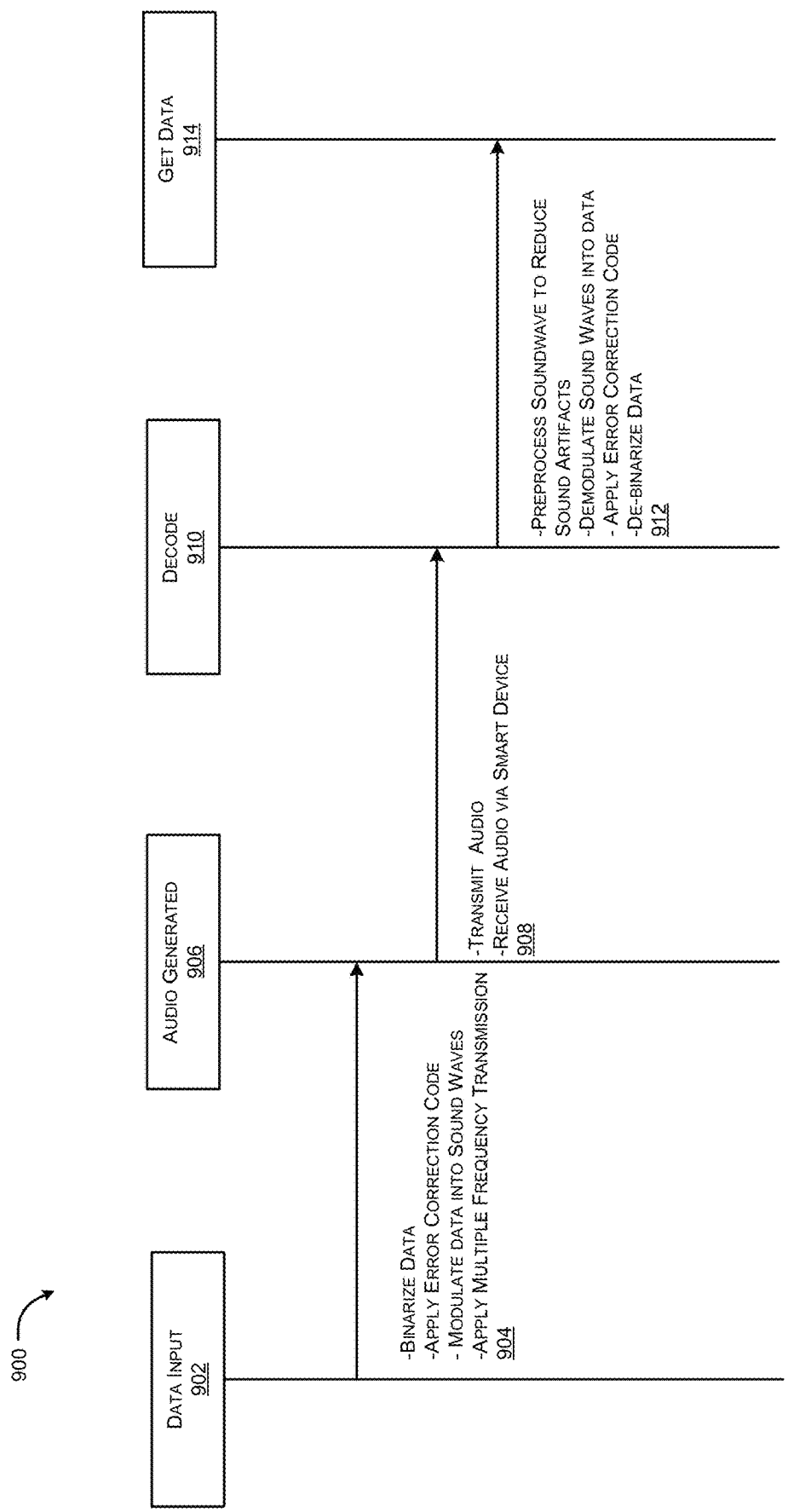
FIG. 9 illustrate an exemplary implementation (900) of the exemplary overview of the proposed system in accordance with an embodiment of the present disclosure.

FIG. 9 illustrate an exemplary implementation (900) of the exemplary overview of the proposed system in accordance with an embodiment of the present disclosure.

As illustrated, the proposed system can be thus summarised through a system block flow diagram that can include a block 902 data input that may be sent to block 904 to binarize the data, apply error correction code, modulate data into sound waves, and apply a plurality of frequency transmission. The audio signal thus generated at block 906 may be then transmitted and then received via a smart device at block 908. The received audio data may be then decoded at block 910. The decoded data may be then pre-processed to reduce sound artifacts, demodulate the sound signals into data, apply error correction code and de-binarize data at block 912 and get data at block 914.

Figure 10:
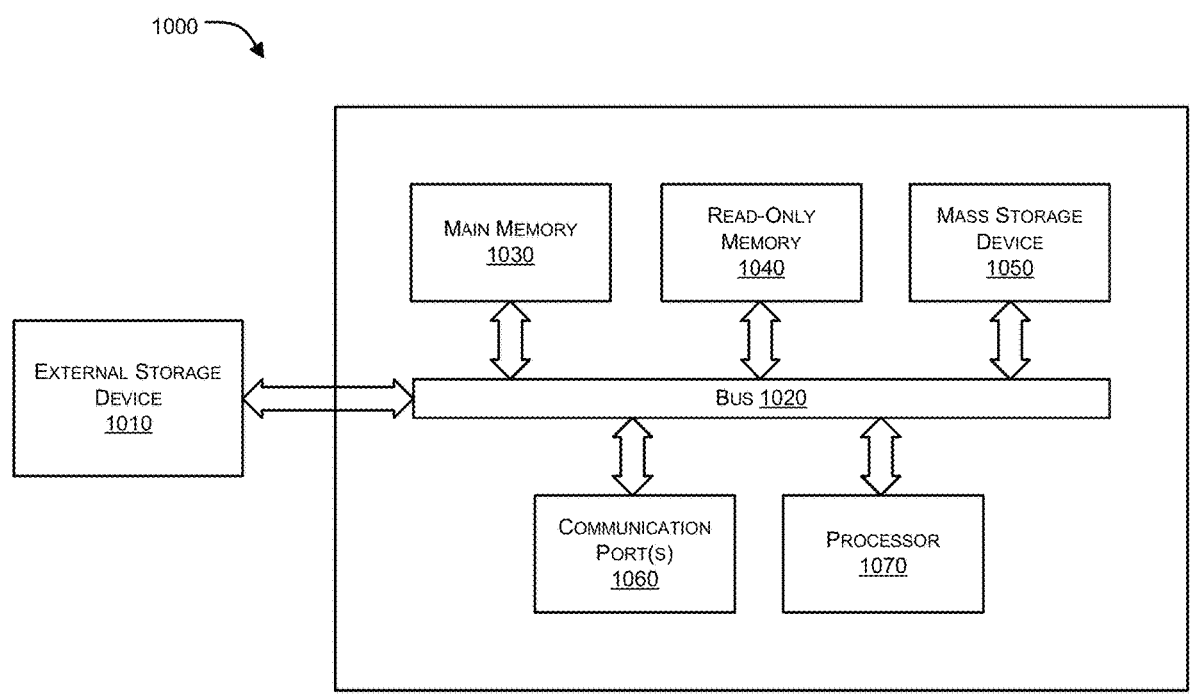
FIG. 10 illustrates an exemplary computer system in which or with which embodiments of the present invention can be utilized in accordance with embodiments of the present disclosure.

FIG. 10 illustrates an exemplary computer system in which or with which embodiments of the present invention can be utilized in accordance with embodiments of the present disclosure. As shown in FIG. 10, computer system 1000 can include an external storage device 1010, a bus 1020, a main memory 1030, a read only memory 1040, a mass storage device 1050, communication port 1060, and a processor 1070. A person skilled in the art will appreciate that the computer system may include more than one processor and communication ports. Examples of processor 1070 include, but are not limited to, an Intel® Itanium® or Itanium 2 processor(s), or AMD® Opteron® or Athlon MP® processor(s), Motorola® lines of processors, FortiSOC™ system on chip processors or other future processors. Processor 1070 may include various modules associated with embodiments of the present invention. Communication port 1060 can be any of an RS-232 port for use with a modem based dialup connection, a 10/100 Ethernet port, a Gigabit or 10 Gigabit port using copper or fiber, a serial port, a parallel port, or other existing or future ports. Communication port 1060 may be chosen depending on a network, such a Local Area Network (LAN), Wide Area Network (WAN), or any network to which computer system connects. Memory 1030 can be Random Access Memory (RAM), or any other dynamic storage device commonly known in the art. Read-only memory 1040 can be any static storage device(s) e.g., but not limited to, a Programmable Read Only Memory (PROM) chips for storing static information e.g., start-up or BIOS instructions for processor 1070. Mass storage 1050 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 782 family) or Hitachi (e.g., the Hitachi Deskstar 7K800), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 1020 communicatively couples processor(s) 1070 with the other memory, storage and communication blocks. Bus 1020 can be, e.g., a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 1070 to software system.

Optionally, operator and administrative interfaces, e.g., a display, keyboard, and a cursor control device, may also be coupled to bus 1020 to support direct operator interaction with a computer system. Other operator and administrative interfaces can be provided through network connections connected through communication port 1060. The external storage device 1010 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

Advantages of the Present Disclosure

The present disclosure is to provide for a system and method to facilitate transfer of data using ultrasonic or near-ultrasonic audio waves to allow ease and a universally easy method of broadcasting data, transferring data and receiving data.

The present disclosure is to provide for a system and method to facilitate emission of data that is robust and resistant to the noise inherently present in the transmission medium.

The present disclosure is to provide for a system and method to facilitate processing of data by applying spectral gating in-order to make it robust and resistant to the noise inherently present in the transmission medium.

The present disclosure is to provide for a system and method to facilitate processing of data by applying noise reduction in-order to make it robust and resistant to the noise inherently present in the transmission medium.

The present disclosure is to provide for a system and method to facilitate identification of products based on the data emitted by beacons placed near the products The present disclosure is to provide for a system and method to facilitate securing handshake for transaction with inclusion of encrypted data being sent to allow secured transaction.

The present disclosure is to provide for a system and method to facilitate identifying users who are located nearby using receiver and emitter of data over sound for various purposes of identification.

The present disclosure is to provide for a system and method to facilitate emission and detection of the data being transferred.

The present disclosure is to provide for a system and method to facilitate emission of audio signal without being audible.

The present disclosure is to provide for a system and method to facilitate real time decoding of the code.

The present disclosure is to provide for a system and method to facilitate code-found stopping criterion to stop capturing the audio signal once the code is decoded.

We claim:

1. A system for facilitating error-free communication of data, said system comprising:
   a control engine comprising a processor, wherein the processor is operatively coupled with a memory, said memory storing instructions executable by the processor to:
   receive, from a transmitting device, an audio signal embedded with a code, said code corresponding to bits associated with data transmitted by the transmitting device;
   facilitate, by the control engine, demodulation of the received audio signal by generating an aggregate sum of a plurality of frequencies and temporal voting to generate a confidence score based on power of the plurality of frequencies pertaining to any near-ultrasonic and ultrasonic frequency range, wherein the temporal voting corresponds to voting of number of occurrences of a repeating frequency over each time frame of a plurality of time frames; and extract said bits from the demodulated audio signal to obtain said code based on said demodulation and said generated confidence score.

2. The system as claimed in claim 1, wherein the control engine coupled to the transmitting device is configured to generate the code associated with the audio signal to be transmitted.

3. The system as claimed in claim 2, wherein the control engine facilitates binarization of the code by getting the code as a symbol with each symbol corresponding to at least a 3-bit binary code by using a dictionary of predefined bits corresponding to each symbol, wherein the control engine further facilitates modulation of the binarized code by transforming said code into the audio signal in said near-ultrasonic and ultrasonic frequency range, and wherein said bits of said binarized code are randomized over the plurality of frequencies pertaining to said near-ultrasonic or said ultrasonic frequency range.

4. The system as claimed in claim 3, wherein the audio signal is transmitted separately or by embedding with other audio signals.

5. The system as claimed in claim 1, wherein an error correction engine pertaining to the control engine is configured to introduce redundancy and randomize said bits associated with the data to be transmitted across time and the plurality of frequencies by applying error correction code to said code, and wherein the redundant and randomized bits are modulated into the plurality of frequencies for providing additional redundancy and minimizing errors.

6. The system as claimed in claim 1, wherein the error correction engine pertaining to the control engine coupled to a receiving device is configured to de-randomize and correct errors to remove redundancy and randomness required for obtaining correct code from the data transmitted.

7. The system as claimed in claim 1, wherein a pre-processing engine pertaining to the control engine is configured to clean up and reduce noise in the audio signal received before demodulation of said audio signal takes place.

8. The system as claimed in claim 7, wherein the pre-processing engine smoothens the audio signal received through noise subtraction using pre-defined noise profiles and spectral gating with predefined threshold frequencies.

9. The system as claimed in claim 8, wherein the pre-processing engine is configured to split the received audio signal into the plurality of time frames and generate a spectrogram of the audio signal over the plurality of time frames to obtain distribution of frequencies and the power of said frequencies.

10. The system as claimed in claim 9, wherein the pre-processing engine is configured to identify dominant frequencies in each time frame of the plurality of time frames by using said confidence scores, and wherein bits pertaining to the audio signal of each time frame having maximum confidence score are determined as the correct bits extracted.

11. The system as claimed in claim 10, wherein the dominant frequencies in each time frame are determined through said aggregate sum of plurality of frequencies and temporal voting.

12. The system as claimed in claim 10, wherein the correct extracted bits are de-binarized to obtain the code transmitted.

13. The system as claimed in claim 8, wherein said spectral gating with said predefined threshold frequencies are applied to remove frequencies having power below said pre-defined threshold.

14. A method for facilitating error-free communication of data, said method comprising:

receiving, from a transmitting device, an audio signal embedded with a code, wherein the code corresponds to bits associated with data transmitted by the transmitting device;

facilitating, by the control engine, demodulation of the received audio signal by generating an aggregate sum of a plurality of frequencies and temporal voting to generate a confidence score based on power of the plurality of frequencies pertaining to any near-ultrasonic and ultrasonic frequency range, wherein the temporal voting corresponds to voting of number of occurrences of a repeating frequency over each time frame of a plurality of time frames; and extracting, said bits from the demodulated audio signal to obtain said code based on said demodulation and said generated confidence score.

15. The method as claimed in claim 14, wherein the control engine coupled to the transmitting device is configured to generate the code associated with the data to be transmitted.

16. The method as claimed in claim 15, wherein the method comprises binarization of the code by getting the code as a symbol with each symbol corresponding to at least a 3-bit binary code by using a dictionary of predefined bits corresponding to each symbol, wherein the method further comprises modulation of the binarized code by transforming said code into the audio signal in said near-ultrasonic and ultrasonic frequency range, and wherein said bits of said binarized code are randomized over the plurality of frequencies pertaining to said near-ultrasonic or said ultrasonic frequency range.

17. The method as claimed in claim 15, wherein the audio signal is transmitted separately or by embedding with other audio signals.

18. The method as claimed in claim 15, wherein an error correction engine pertaining to the control engine coupled to the transmitting device is configured to introduce redundancy and randomize said bits pertaining to the code to be transmitted across time and the plurality of frequencies by applying error correction code to said data, and wherein the redundant and randomized bits are modulated into the plurality of frequencies for providing additional redundancy and minimizing errors.

19. The method as claimed in claim 14, wherein the error correction engine pertaining to the control engine coupled to the receiving device is configured to de-randomize and correct errors to remove redundancy and randomness required for obtaining correct code from the audio signal received by the receiving device.

20. The method as claimed in claim 14, wherein a pre-processing engine pertaining to the control engine is configured to clean up and reduce noise in the audio signal received before demodulation.

21. The method as claimed in claim 20, wherein the pre-processing engine smoothens the audio signal received through noise subtraction using pre-defined noise profiles and spectral gating with predefined threshold frequencies.

22. The method as claimed in claim 21, wherein the pre-processing engine configured to split the received audio signal into the plurality of time frames and generate a spectrogram of the audio signal over the plurality of time frames to obtain distribution of frequencies and the power of said frequencies.

23. The method as claimed in claim 22, wherein the pre-processing engine is configured to identify dominant frequencies in each time frame of the plurality of time frames by using said confidence scores, and wherein bits pertaining to the audio signal of each time frame having maximum confidence score are determined as the correct bits extracted.

24. The method as claimed in claim 23, wherein the dominant frequencies in each time frame are determined through said aggregate sum of the plurality of frequencies and temporal voting.

25. The method as claimed in claim 23, wherein the correct extracted bits are de-binarized to obtain the code transmitted.

26. The method as claimed in claim 21, wherein said spectral gating with said predefined threshold frequencies are applied to remove frequencies having power below said pre-defined threshold frequencies.

* * * * *